(12) United States Patent
Sugiyama

(10) Patent No.: US 8,884,840 B2
(45) Date of Patent: Nov. 11, 2014

(54) CORRECTION OF SPECTRAL DIFFERENCES IN A MULTI-DISPLAY SYSTEM

(75) Inventor: Koichi Sugiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 220 days.

(21) Appl. No.: 13/195,084

(22) Filed: Aug. 1, 2011

(65) Prior Publication Data

US 2012/0032969 A1 Feb. 9, 2012

(30) Foreign Application Priority Data

Aug. 4, 2010 (JP) ................. 2010-175817

(51) Int. Cl.
G09G 5/00 (2006.01)
G09G 5/02 (2006.01)
G09G 5/10 (2006.01)
G06F 3/14 (2006.01)

(52) U.S. Cl.
CPC ........ *G06F 3/1431* (2013.01); *G09G 2360/145* (2013.01); *G09G 2320/0233* (2013.01)
USPC ............. 345/1.1; 345/207; 345/1.3; 345/589; 345/690

(58) Field of Classification Search
CPC ................ G09G 2320/0233; G09G 2320/045; G09G 2360/145; G09G 2360/147; G09G 2360/148
USPC ............................ 345/1.1–1.3, 207, 589, 690
See application file for complete search history.

(56) References Cited

U.S. PATENT DOCUMENTS

| | | | |
|---|---|---|---|
| 8,390,644 B2* | 3/2013 | Marcu et al. | 345/590 |
| 2007/0052694 A1* | 3/2007 | Holmes | 345/204 |
| 2009/0167782 A1* | 7/2009 | Petljanski et al. | 345/601 |
| 2010/0201716 A1* | 8/2010 | Tanizoe et al. | 345/690 |

FOREIGN PATENT DOCUMENTS

| | | |
|---|---|---|
| JP | 02-141796 A | 5/1990 |
| JP | 2007-310096 A | 11/2007 |
| JP | 2008-216334 | 9/2008 |
| JP | 2008-299066 A | 12/2008 |
| JP | 2009-216808 A | 9/2009 |
| JP | 2009-216809 A | 9/2009 |
| WO | 2009/086468 A1 | 7/2009 |

* cited by examiner

*Primary Examiner* — Lun-Yi Lao
*Assistant Examiner* — Ibrahim Khan
(74) *Attorney, Agent, or Firm* — Renner, Otto, Boisselle & Sklar, LLP

(57) ABSTRACT

A multi-display system includes a test pattern display controller that causes a test pattern to be displayed in a predetermined display region on a periphery of an LCD module of each image display device, an optical transmitting unit that constitutes a plurality of transmission channels each capable of transmitting an emitted light from each of the display regions, a spectral radiance sensor that detects spectral characteristics of the emitted light transmitted by each of the transmission channels, and an adjustment unit that adjusts, based on the spectral characteristics detected by the spectral radiance sensor, luminance and chromaticity of the image display device having the LCD module that has outputted the emitted light having the spectral characteristics so that the difference from luminance and chromaticity of the adjacent image display devices decreases.

5 Claims, 9 Drawing Sheets

CORRECTION OF SPECTRAL DIFFERENCES IN A MULTI-DISPLAY SYSTEM

CROSS-REFERENCE TO RELATED APPLICATION

This application claims priority to Japanese Patent Application No. 2010-175817, which was filed on Aug. 4, 2010, the contents of which are incorporated herein by reference in its entirety.

BACKGROUND OF THE TECHNOLOGY

1. Field of the Technology

The technology relates to a multi-display system capable of adjusting luminance and chromaticity of a plurality of image display devices constituting a multi-display screen to thereby eliminate a luminance shift and a chromaticity shift between the respective adjacent image display devices.

2. Description of the Related Art

In recent years, a so-called "multi-display system" is being practically used in which a large display screen (hereinafter referred to as a "multi-display screen") is formed by the entirety of a plurality of image display devices by arranging the plurality of image display devices having a display panel capable of displaying image information close to each other.

FIG. 9 is a view schematically showing a multi-display system 200 according to the related art. The multi-display system 200 is configured by arranging four image display devices 201 which each include a display panel 202 having a same screen size close to each other in a 2-by-2 matrix form, whereby a multi-display screen 200a is formed. The multi-display screen 200a is twice the screen size of a single image display device 201 in both the vertical and horizontal directions. The image display device 201 used in such a multi-display system 200 is not an image display device dedicated for a multi-display system, but is a common product or a general-purpose product which can be used alone.

A multi-display screen which is being used in practice is superior in portability, display resolution, and degree of freedom in its layout when installed, unlike a large-size display having a single fixed display screen installed outdoors (for example, LED displays, plasma displays, liquid-crystal displays, and the like).

In the multi-display system, by connecting a plurality of image display devices in synchronization, it is possible to display an image on the entire display screen as if it were a single large-size display, and to display a different image on a part of the image display devices among the plurality of image display devices or on each image display device.

A multi-display system according to the related art is disclosed in Japanese Unexamined Patent Publication JP-A 2009-216808. The multi-display system is configured by arranging a plurality of display devices which each include a liquid-crystal display panel as a display panel in a matrix form. A sensor for detecting lighting intensity (illuminance level) is provided around the screen of each display device. The luminance of the screen of the display panel is controlled by controlling the driving of the backlights of the respective liquid-crystal display panels based on the illuminance level detected by a sensor provided in a reference display device. In this way, the luminance of the screens of all display devices is adjusted to luminance corresponding to the illuminance level detected by the reference display device, so that the screens of all display devices have the same luminance. Thus, it is possible to prevent the occurrence of luminance unevenness in the multi-display screen.

When a multi-display system is put into practical use, there is a problem in that a luminance shift and a chromaticity shift occur between the respective adjacent image display devices due to individual differences between the respective adjacent image display devices and changes over time occurring individually. When a luminance shift and a chromaticity shift occur between the respective image display devices, there is a problem in that the displayed image appears unnatural to an observer, thus giving a feeling of unease to the observer.

The multi-display system of the related art disclosed in JP-A 2009-216808 prevents the occurrence of luminance unevenness of the multi-display screen by adjusting luminance of the screens of all display devices to luminance corresponding to the illuminance level of the surrounding of the screen, detected by the reference display device. However, the multi-display system is not configured to adjust luminance and chromaticity of the screen of each display panel while focusing on the individual differences between the respective image display devices and the temporal change of the individual image display device. Moreover, although JP-A 2009-216808 discloses a technique of adjusting luminance of a screen by controlling the driving of a backlight, a technique of adjusting the chromaticity of the screen is not disclosed.

Furthermore, in the related art, when eliminating the luminance shift and chromaticity shift between the respective adjacent image display devices, adjustment is executed for each image display device using a dedicated adjustment device. The adjustment operation using such a dedicated adjustment device incurs a lot of time and labor. In addition, there is a problem in that in order to execute adjustment using such a dedicated adjustment device, it is necessary to execute the adjustment operation after the operation of the multi-display system is halted once.

SUMMARY OF THE TECHNOLOGY

An object of the technology is to provide a multi-display system capable of easily eliminating a luminance shift and a chromaticity shift between respective adjacent image display devices resulting from individual differences between the respective image display devices and changes over time occurring individually without halting the operation of the multi-display system.

The technology provides a multi-display system comprising a multi-display screen formed by arranging a plurality of image display devices each having a display panel capable of displaying image information to lie side-by-side, the multi-display system comprising:

a test pattern display controller that causes a plurality of predetermined display colors to be sequentially displayed in a predetermined display region on a periphery of each of the display panels;

a transmitting unit that constitutes a plurality of transmission channels each capable of transmitting an emitted light from the display region of each of the display panels;

a spectral characteristics detector that detects spectral characteristics of the emitted light transmitted by each of the transmission channels; and an adjustment unit that adjusts, based on the spectral characteristics detected by the spectral characteristics detector, luminance and chromaticity of the image display device having the display panel that has outputted the emitted light having the spectral characteristics so that a difference from luminance and chromaticity of adjacent image display devices decreases.

A plurality of predetermined display colors for adjusting luminance and chromaticity is sequentially displayed in a predetermined display region on a periphery of a display panel of each of the image display devices of the multi-display system, and the spectral characteristics of an emitted light from a display region when the display color is displayed are detected by the spectral characteristics detector. Moreover, the adjustment unit adjusts, based on the spectral characteristics detected by the spectral characteristics detector, luminance and chromaticity of the image display device having the display region that has outputted the emitted light having the spectral characteristics so that the difference from luminance and chromaticity of adjacent image display devices decreases.

Therefore, the display panel of each of the image display devices can display an adjustment display color in the predetermined display region on the periphery of the display panel and display an image to be displayed during operation of the multi-display system in the remaining region excluding the display region. That is, even when the multi-display system is being operated, it is possible to adjust luminance and chromaticity of the respective image display devices.

Moreover, it is not necessary to execute adjustment for each image display device using a dedicated adjustment device unlike the related art, but luminance and chromaticity of the respective image display devices are adjusted automatically. Thus, an adjustment operation by an operator is not necessary, and the luminance shift and chromaticity shift between the adjacent image display devices can be eliminated easily. In addition, the size of the display region in which the display color for adjusting the luminance and chromaticity is displayed can be set appropriately. Thus, by setting the size of the region as small as possible, even when the adjustment display color is displayed during the operation of the multi-display system, it is possible to minimize the effect on the visibility of the image displayed in the remaining region excluding the display region.

Furthermore, luminance and chromaticity of the respective image display devices are adjusted based on the detected spectral characteristics of the emitted light from the display region when the adjustment display color is displayed. Therefore, it is possible to eliminate the luminance shift and the chromaticity shift between the adjacent image display devices resulting from the individual differences between the respective image display devices and the temporal change. Thus, it is possible to display images on the multi-display screen without giving a feeling of unease to the observer.

It is preferable that the adjustment unit includes:

a color correction information generator that generates color correction information for carrying out a color correction process on image information to be displayed on the respective display panels, based on the spectral characteristics detected by the spectral characteristics detector; and a color correction unit that executes a color correction process on the image information to be displayed on the respective display panels, using the color correction information generated by the color correction information generator.

The adjustment unit generates the color correction information for carrying out the color correction process on the image information to be displayed on the respective display panels and caries out the color correction process on the image information to be displayed using the generated color correction information. In this way, since luminance and chromaticity are adjusted by the color correction process, it is possible to reliably eliminate a luminance shift and a chromaticity shift between the adjacent image display devices.

It is preferable that the adjustment unit further includes a storage unit that stores a reference value that is determined in advance as the spectral characteristics of the plurality of predetermined display colors, and the color correction information generator calculates a correction coefficient used for the color correction process, based on a detection value of spectral characteristics detected by the spectral characteristics detector and a reference value stored in the storage unit and outputs a calculated correction coefficient to the color correction unit as color correction information.

A correction coefficient used for the color correction process is calculated based on a detection value of spectral characteristics detected for the emitted lights of the plurality of predetermined display colors and a reference value that is determined in advance as spectral characteristics of the plurality of predetermined display colors, and a calculated correction coefficient is outputted to the color correction unit as color correction information. In this way, since luminance and chromaticity are adjusted based on the reference value and the detection value, it is possible to reliably eliminate a luminance shift and a chromaticity shift between the adjacent image display devices.

It is preferable that the transmitting unit includes:

a coupler that connects a plurality of first transmission channels provided in the respective display regions with a single second transmission channel connected to the single spectral characteristics detector so that the emitted light can be transmitted;

switches that are attached to the respective first transmission channels and configured to be selectable between a transmission state where transmission of the emitted light in the respective first transmission channels is allowed and a cut-off state where transmission of the emitted light in the first transmission channels is cut; and a switching controller that controls the respective switches so that the respective first transmission channels sequentially enter the transmission state in a predetermined order.

The transmission channel for transmitting the emitted light from the predetermined display region is configured by connecting the plurality of first transmission channels provided in the predetermined display regions with the single second transmission channel connected to the single spectral characteristics detector by the coupler. Moreover, the switches configured to be selectable between the transmission state where the transmission of the emitted light is allowed and the cut-off state where the transmission of the emitted light is cut are attached to the respective first transmission channels. The respective switches are controlled by the switching controller so that the respective first transmission channels sequentially enter the transmission state in a predetermined order.

As described above, since the spectral characteristics of the emitted light from the display region of each of the respective image display devices is detected by the single spectral characteristics detector, it is possible to decrease the overall cost of the multi-display system as compared to when the spectral characteristics detector is provided in each display region. Moreover, since it is not necessary to take the individual differences between the spectral characteristics detectors into account, it is possible to adjust luminance and chromaticity accurately.

When the spectral characteristics detector is provided in each display region, individual differences between the plural sensors, and an operational delay and a control delay due to sensing and analog/digital (A/D) conversion may occur.

However, since measurement is executed by the single spectral characteristics detector, the individual differences are eliminated, and the operational delay and the control delay can be suppressed.

It is preferable that the multi-display system further comprises an adjustment process controller that outputs an execution command for a process of adjusting luminance and chromaticity of the image display device, and the adjustment process controller outputs the execution command at a predetermined cycle.

In the multi-display system, the adjustment process controller outputs the execution command for the process of adjusting luminance and chromaticity of the image display device at the predetermined cycle. Therefore, it is possible to dynamically cope with the temporal change of the image display device or a sudden change in the operational conditions and to eliminate the luminance shift and the chromaticity shift between the adjacent image display devices following the decrease and variation in the display performance.

The technology also provides a multi-display system comprising a multi-display screen formed by arranging a plurality of image display devices each having a display panel capable of displaying image information to lie side-by-side, the multi-display system comprising:

a transmitting unit that constitutes a plurality of transmission channels each capable of transmitting an emitted light from a predetermined display region on a periphery of each of the display panels;

a spectral characteristics detector that detects spectral characteristics of the emitted light transmitted by the transmission channel; and an adjustment unit that adjusts, based on the spectral characteristics detected by the spectral characteristics detector, luminance and chromaticity of the image display device having the display panel that has outputted the emitted light having the spectral characteristics so that a difference from luminance and chromaticity of adjacent image display devices decreases, the adjustment unit comprising a storage unit that stores a reference value that is determined in advance as spectral characteristics of a plurality of predetermined display colors, when the spectral characteristics of the emitted light for the predetermined display color is detected by the spectral characteristics detector, the storage unit storing the detected value of the spectral characteristics for each image display device, and with respect to an image display device in which the detection value of the spectral characteristics is stored for all of the plurality of display colors, the adjustment unit adjusting luminance and chromaticity of the image display device.

The spectral characteristics of the emitted light from a predetermined display region on the periphery of the display panel of each image display device of the multi-display system is detected by the spectral characteristics detector. The reference value that is determined in advance as the spectral characteristics of the plurality of predetermined display colors is stored in the storage unit which is provided in the adjustment unit. Moreover, when the spectral characteristics of the emitted light of the predetermined display color are detected by the spectral characteristics detector, the detection value of the spectral characteristics is stored in the storage unit for each image display device. Furthermore, when the detection value of the spectral characteristics is detected for all of the plurality of display colors in one image display device, the adjustment unit adjusts luminance and chromaticity of the image display device so that the difference from luminance and chromaticity of the adjacent image display devices decreases.

Therefore, since it is not necessary to display the adjustment display color in the display region, it is possible to simplify the device configuration. Moreover, even when the multi-display system is being operated, it is possible to adjust luminance and chromaticity of the respective image display device.

Moreover, it is not necessary to execute adjustment for each image display device using a dedicated adjustment device unlike the related art, but luminance and chromaticity of the respective image display devices are adjusted automatically. Thus, an adjustment operation by an operator is not necessary, and the luminance shift and chromaticity shift between the adjacent image display devices can be eliminated easily. In addition, the size of the display region in which the display color for adjusting luminance and chromaticity is displayed can be set appropriately. Thus, by setting the size of the display region as small as possible, even when the adjustment display color is displayed during the operation of the multi-display system, it is possible to minimize the effect on the visibility of the image displayed in the remaining region excluding the display region.

Furthermore, luminance and chromaticity of the respective image display devices are adjusted based on the detected spectral characteristics of the emitted light from the display region when a predetermined display color is actually displayed. Therefore, it is possible to eliminate the luminance shift and the chromaticity shift between the adjacent image display devices resulting from the individual differences of the respective image display devices and the temporal change. Thus, it is possible to display images on the multi-display screen without giving a feeling of unease to the observer.

BRIEF DESCRIPTION OF THE DRAWINGS

Other and further objects, features, and advantages of the technology will be more explicit from the following detailed description taken with reference to the drawings wherein:

FIGS. 3A to 3C are views illustrating an installed state of a first optical fiber in the image display device, wherein FIG. 3A is a perspective view schematically showing the image display device to which the first optical fiber is attached, FIG. 3B is an enlarged bottom view of the vicinity of an attachment portion of the first optical fiber in FIG. 3A, and FIG. 3C is an enlarged front view of the vicinity of the attachment portion of the first optical fiber in FIG. 3A;

DETAILED DESCRIPTION

Figure 1:
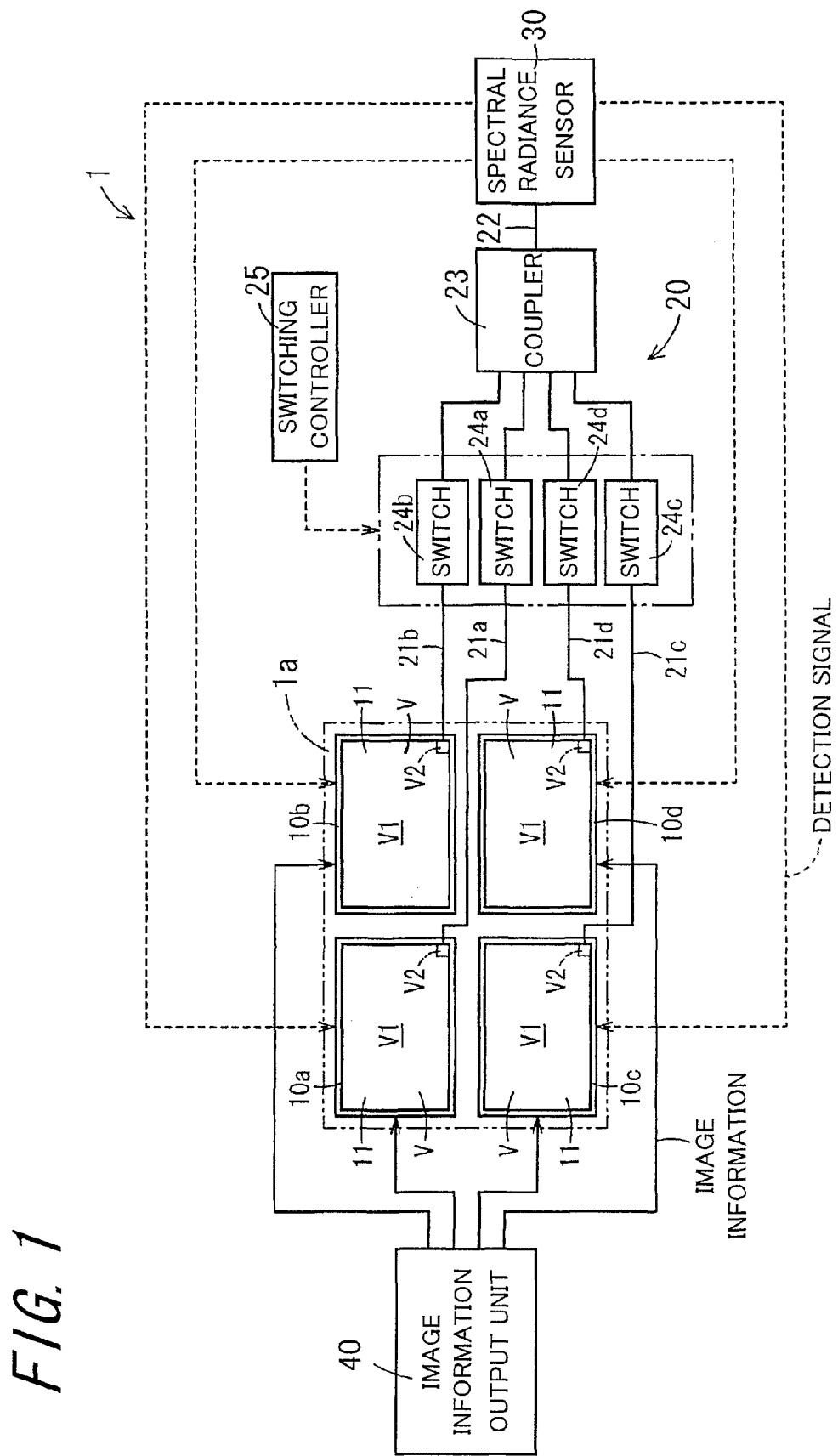
FIG. 1 is a system diagram schematically showing a multi-display system according to one embodiment.

Now referring to the drawings, preferred embodiments are described below.

FIG. 1 is a system diagram schematically showing a multi-display system 1 according to one embodiment. The multi-display system 1 comprises four image display devices 10a to 10d, an optical transmitting unit 20, a single spectral radiance sensor 30, and an image information output unit 40.

The respective image display devices 10a to 10d include liquid crystal display (abbreviated as LCD) modules 11 having the same screen size. The multi-display system 1 is configured by arranging four image display devices 10a to 10d close to each other in a 2-by-2 matrix.

A multi-display screen 1a is formed by the screens of the image display devices 10a, 10b, 10c, and 10d which are located top-left, top-right, bottom-left, and bottom-right as viewed from a front side. The multi-display screen 1a has a screen size twice that of the single image display device 10a in both the vertical and horizontal directions.

In the present embodiment, although the four image display devices 10a to 10d are located at different positions, they have the same configurations. Thus, in the following description, the image display devices 10a to 10d will be referred to as an image display device 10, omitting the suffixes a to d unless it is necessary to distinguish between them.

Figure 2:
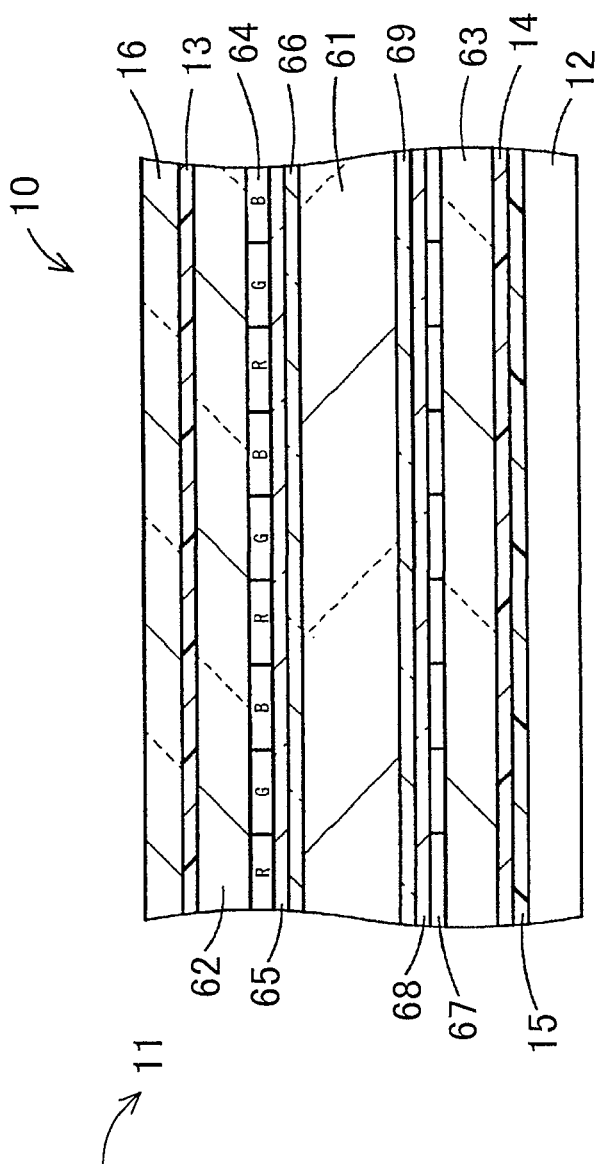
FIG. 2 is a cross-sectional view schematically showing the configuration of an image display device.

FIG. 2 is a cross-sectional view schematically showing the configuration of the image display device 10. The image display device 10 comprises the LCD module 11, a backlight unit 12, polarizers 13 and 14, a diffuser 15, and a protective glass 16.

The LCD module 11 which is a display panel includes a liquid crystal layer 61 and first and second glass substrates 62 and 63. On one side of a surface of the first glass substrate 62 in a thickness direction thereof, a color filter 64, a transparent electrode 65, and an alignment film 66 are stacked. Moreover, on one side of a surface of the second glass substrate 63 in the thickness direction thereof, an alignment film 69, a transparent electrode 68 forming pixels, and thin-film transistors 67 connected thereto are stacked.

The LCD module 11 is configured by filling liquid crystals in a sealed manner between the first and second glass substrates 62 and 63 in a state where the alignment films 66 and 69 face each other to thereby form the liquid crystal layer 61.

The backlight unit 12 is disposed so as to face a back side of the LCD module 11, namely a surface of the second glass substrate 63 on the other side in the thickness direction thereof (hereinafter referred to as a "light entrance surface"). The backlight unit 12 has a function of emitting light to the LCD module 11 from the back side thereof.

In the present embodiment, the backlight unit 12 is configured, for example, by an edge-lit backlight which includes a light source that emits light to a light guide plate from a lateral side and the light guide plate that emits the light entering from the lateral side toward the LCD module 11. The backlight unit 12 is not limited to this, and may be configured, for example, by a bottom-lit backlight in which a plurality of light emitting diodes (LEDs) is arranged so as to face the light entrance surface of the second glass substrate 63.

The polarizer 13 is disposed on a surface of the first glass substrate 62 on the other side in the thickness direction thereof (hereinafter referred to as a "light exiting surface"), and the polarizer 14 is disposed on the light entrance surface of the second glass substrate 63. The polarizers 13 and 14 are provided so as to transmit linearly polarized lights that are perpendicular to each other.

The diffuser 15 is arranged between the backlight unit 12 and the polarizer 14 disposed on the light entrance surface of the second glass substrate 63. The diffuser 15 has a function of diffusing the light emitted from the backlight unit 12 in all directions.

The protective glass 16 is disposed on the surface of the polarizer 13 on the opposite side to the side facing the first glass substrate 62. The protective glass 16 has a function of protecting the LCD module 11.

With this configuration, a linearly polarized light having passed through the polarizer 14 among the light emitted from the backlight unit 12 enters the polarizer 13 through the liquid crystal layer 61. In this case, the polarization state of the light passing through the liquid crystal layer 61 can be changed by a voltage applied to the liquid crystal layer 61. Thus, by applying a voltage corresponding to image information between the transparent electrodes 65 and 68 on the first and second glass substrates 62 and 63 to thereby apply an electric field to the liquid crystal layer 61, it is possible to change the polarization state of the light passing through the liquid crystal layer 61 and to control the amount of the light passing through the polarizer 13 to thereby form an optical image.

In the LCD module 11, as shown in FIG. 1, a display region V2 for displaying image information of a test pattern described later used for adjusting luminance and chromaticity of the image display device 10 is set in a periphery of a display region V which is a rectangular region capable of displaying image information. In the present embodiment, the display region V2 is set in the corner on the bottom right side of the display region V.

That is, the image display device 10 is capable of displaying the image information of the test pattern in the display region V2 and displaying the image information to be displayed during the operation of the multi-display system 1 in the remaining display region V1 excluding the display region V2.

As described above, since the display region V2 is set in the periphery of the display region V, even when the image information of the test pattern is displayed in the display region V2, it is possible to decrease the effect on the image displayed in the display region V1.

The position of the display region V2 can be set to an appropriate position of the periphery of the display region V. For example, the position of the display region V2 may be set to any one of top-right, top-left, and bottom-left corners of the display region V. Moreover, the position of the display region V2 may be set to an edge adjacent to any one of the four edges that define the display region V.

The size of the display region V2 is preferably set to be approximately one to several dot pixels in order to decrease the effect on the image displayed in the display region V1 as much as possible. In the present embodiment, the size of the display region V2 is set to one dot pixel made up of R (Red), G (Green), and B (Blue) subpixels. In addition, the color of a pixel is determined by additive mixing of the colors of the respective subpixels.

As shown in FIG. 1, the optical transmitting unit 20 which is a transmitting unit is configured to be capable of transmitting emitted lights emitted from the respective display regions V2 of the four image display devices 10a to 10d to the single spectral radiance sensor 30.

Specifically, the optical transmitting unit 20 comprises first optical fibers 21a to 21d provided in each display region V2, a single second optical fiber 22 connected to the spectral radiance sensor 30, a coupler 23 provided between the first optical fibers 21a to 21d and the second optical fiber 22, switches 24a to 24d attached to the first optical fibers 21a to 21d, and a switching controller 25 that controls the respective switches 24a to 24d.

The first optical fiber 21a is provided so that one end thereof faces the display region V2 of the image display device 10a and the other end is connected to the coupler 23.

The first optical fiber 21a is configured to receive the emitted light outputted from the display region V2 of the image display device 10a and guide the emitted light from one end to the other end. That is, the first optical fiber 21a constitutes a first transmission channel capable of transmitting the emitted light outputted from the display region V2 of the image display device 10a.

Figure 3A:
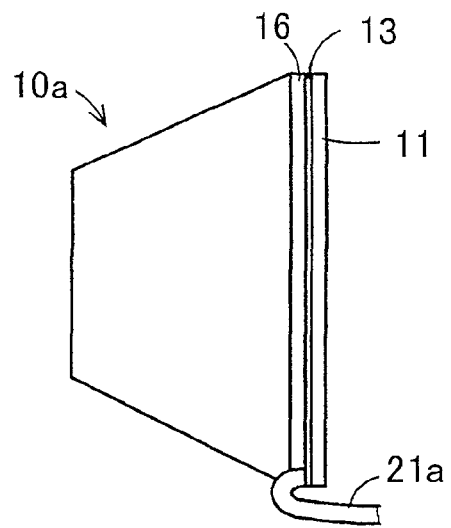
Figure 3B:
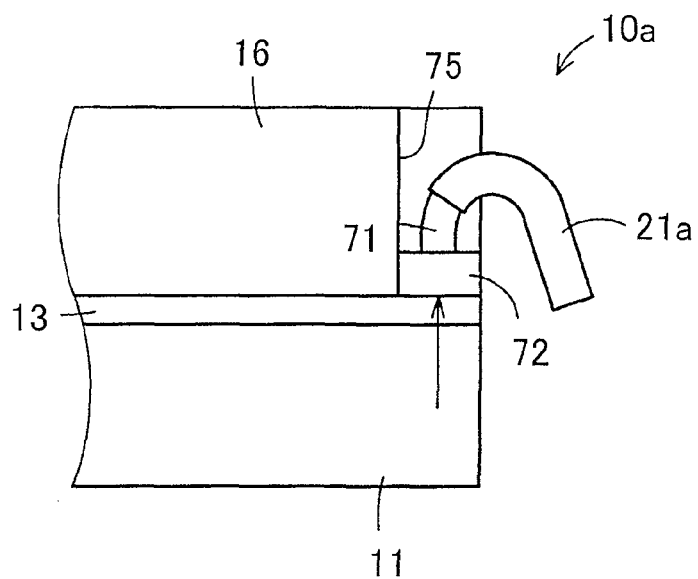
Figure 3C:
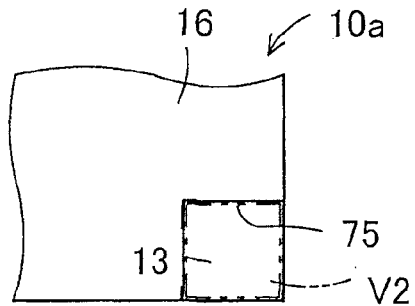

FIGS. 3A to 3C are views illustrating an installed state of the first optical fiber 21a in the image display device 10a. FIG. 3A is a perspective view schematically showing the image display device 10a to which the first optical fiber 21a is attached, and FIG. 3B is an enlarged bottom view of the vicinity of the attachment portion of the first optical fiber 21a in FIG. 3A. Moreover, FIG. 3C is an enlarged front view of the vicinity of the attachment portion of the first optical fiber 21a in FIG. 3A. FIGS. 3A and 3B show the image display device 10a while omitting the backlight unit 12, the polarizer 14, and the diffuser 15. Moreover, the first optical fiber 21a is omitted in FIG. 3C.

The first optical fiber 21a has a fiber terminal 71 which is formed at one end thereof, and a light inlet which is configured to be capable of receiving light is formed at a tip end of the fiber terminal 71. Furthermore, a diffuser 72 is attached to the tip end of the fiber terminal 71 so as to face the light inlet. On the other hand, in the image display device 10a, a notch 75 is formed on the protective glass 16 so that the polarizer 13 in the portion corresponding to the display region V2 on the bottom right corner is exposed to the outside.

One end of the first optical fiber 21a is disposed in the space formed by the notch 75 and fixed by adhesion or the like so that the polarizer 13 and the light inlet of the fiber terminal 71 face each other with the diffuser 72 disposed therebetween.

By attaching the first optical fiber 21a to the image display device 10a in the above-described manner, the first optical fiber 21a can receive the emitted light outputted from the display region V2 of the image display device 10a through the diffuser 72 from the light inlet and guide the emitted light to the other end.

Moreover, as described above, since the diffuser 72 is attached to the tip end of the fiber terminal 71, strong light emitted from the display region V2 is prevented from directly entering the spectral radiance sensor 30. In this way, it is possible to prevent damage to the spectral radiance sensor 30 resulting from the entrance of strong light. Moreover, it is possible to prevent a decrease in measurement accuracy of the spectral radiance sensor 30 due to various image formations.

In the present embodiment, although one end of the first optical fiber 21a is disposed on the polarizer 13, the technology is not limited to this, and the end may be disposed on the color filter 64 which is exposed to the outside.

Moreover, in the present embodiment, although the rectangular notch 75 is formed on the protective glass 16 in order to dispose one end of the first optical fiber 21a, the technology is not limited to this, and a through hole may be formed in the protective glass 16.

Similarly, the first optical fibers 21b, 21c, and 21d are attached to the image display devices 10b, 10c, and 10d, respectively, and constitute the first transmission channels capable of transmitting the emitted lights outputted from the display regions V2 of the image display devices 10b, 10c, and 10d, respectively.

The second optical fiber 22 is provided so that one end thereof is connected to the coupler 23 and the other end is connected to the input terminal of the spectral radiance sensor 30. The second optical fiber 22 is configured to guide the emitted light received from one end to the other end. The emitted light guided to the other end is inputted to the spectral radiance sensor 30 through the input terminal of the spectral radiance sensor 30. That is, the second optical fiber 22 constitutes a second transmission channel capable of transmitting the emitted light.

The coupler 23 connects a set of the other ends of the first optical fibers 21a to 21d with one end of the second optical fiber 22 so that the emitted lights can be transmitted. That is, the coupler 23 is configured to guide the emitted lights guided by the respective first optical fibers 21a to 21d to one end of the second optical fiber 22. The coupler 23 can be realized by a multi-branch optical fiber, for example.

The switch 24a is attached to the first optical fiber 21a and is configured to be selectable between a transmission state where guiding of the emitted light from one end to the other end of the first optical fiber 21a is allowed and a cut-off state where the guiding of the emitted light is blocked.

That is, when the switch 24a is in the transmission state, the emitted light emitted from the display region V2 of the image display device 10a is received from one end of the first optical fiber 21a and guided by the first optical fiber 21a. After the emitted light has passed through the switch 24a and the coupler 23, the emitted light is guided by the second optical fiber 22 and inputted to the spectral radiance sensor 30.

In contrast, when the switch 24a is in the cut-off state, the emitted light outputted from the display region V2 of the image display device 10a is received from one end of the first optical fiber 21a, but after that, guiding of the emitted light is cut by the switch 24a. That is, when the switch 24a is in the cut-off state, the emitted light outputted from the display region V2 of the image display device 10a is not inputted to the spectral radiance sensor 30.

Similarly, the switch 24b is attached to the first optical fiber 21b, and is configured to be selectable between the transmission state and the cut-off state as described above. In addition, the switch 24c is attached to the first optical fiber 21c, and is configured to be selectable between the transmission state and the cut-off state as described above. Further, the switch 24d is attached to the first optical fiber 21d, and is configured to be selectable between the transmission state and the cut-off state as described above. In the present embodiment, the switches 24a to 24d are each configured by an electronic shutter.

The switching controller 25 is configured to output a switching control signal for switching between the two states to each of the switches 24a to 24d when an adjustment process described later is started. The respective switches 24a to 24d are configured to switch from the transmission state to the cut-off state or from the cut-off state to the transmission state, based on the switching control signal outputted from the switching controller 25.

In detail, the switching controller 25 outputs the switching control signal based on a program stored in a storage device (not shown) so that the switches 24a to 24d enter the transmission state sequentially in accordance with a predetermined order and the transmission state continues for a predetermined period.

In addition, the switching controller 25 outputs the switching control signal so that two or more of the switches 24a to 24d are not in the transmission state at the same time. That is, the switches 24a to 24d can be in either a state where all switches 24a to 24d are in the cut-off state, or a state where only one of the switches 24a to 24d is in the transmission state. In this way, it is possible to prevent the emitted lights outputted from different display regions V2 from being inputted to the spectral radiance sensor 30 during execution of the adjustment process.

In the present embodiment, the switching controller 25 outputs the switching control signal to the respective switches 24a to 24d in accordance with a program stored in the storage device so that the switches 24a, 24b, 24c, and 24d sequentially enter the transmission state in that order, and the transmission state of each switch 24a to 24d continues only for the period T necessary for displaying all test patterns described above.

The spectral radiance sensor 30, which is a spectral characteristics detector, is a detector that detects spectral characteristics of the emitted light guided by the optical transmitting unit 20. In detail, the spectral characteristics, which is a spectrum, is spectral radiance (unit: $W/(sr \cdot m^2 \cdot nm)$) and is characteristics which indicate the intensity of light, namely luminance, at predetermined wavelength intervals within a predetermined wavelength range. The predetermined wavelength range is a visible wavelength range of 380 nm to 780 nm, for example, and the predetermined wavelength interval is 1 nm, for example.

The spectral radiance sensor 30 is configured, for example, by a polychromator-type spectral radiance meter which uses diffraction gratings or a filter-type luminance colorimeter. The polychromator-type spectral radiance meter has a configuration in which measurement target light is condensed by a lens, the condensed light is separated for each wavelength by gratings, namely diffraction gratings, and luminance for each wavelength is measured by a plurality of photosensors such as a photodiode array. The filter-type luminance colorimeter has poorer accuracy than the polychromator-type spectral radiance meter.

The spectral radiance sensor 30 outputs the detection value of the spectral characteristics of the emitted light guided through each transmission channel to the image display devices 10a to 10d corresponding to the transmission channel as a detection signal.

In the present embodiment, a sensor calibrator (not shown) for calibrating the spectral radiance sensor 30 is provided. The sensor calibrator comprises a calibration optical fiber having an electronic shutter and a light source unit having a reference light source and a reference whiteboard. Specifically, the light source unit is configured such that the reference light source emits light to the reference whiteboard, and the calibration optical fiber is disposed so that one end thereof is connected to the coupler 23 of the optical transmitting unit 20, and the other end faces the reference whiteboard so as to receive light reflected by the reference whiteboard. The electronic shutter is configured to switch between the transmission state and the cut-off state in accordance with the switching control signal outputted from the switching controller 25.

With this configuration, it is possible to execute white and black point correction of the spectral radiance sensor 30. The white point correction is executed by inputting to the spectral radiance sensor 30 the light which is outputted from the reference light source and then reflected by the reference whiteboard. The black point correction is executed based on an output value associated with a dark current of the spectral radiance sensor 30 by cutting the light transmission channel in the calibration optical fiber using an electronic shutter. For example, the calibration of the spectral radiance sensor 30 is automatically executed before the adjustment process described later is executed.

The image information output unit 40 outputs image information for display still images or video images to the image display devices 10a to 10d. Examples of the image information outputted from the image information output unit 40 include image information which is received by a receiver having a function of receiving television broadcast or the like, image information which is played by a recorder/player having a function of recording and playing image information, and image information which is reproduced by a computer.

In case of displaying the image information on the multi-display screen 1a in an enlarged scale, with respect to pieces of image information of split images corresponding four rectangular regions which are obtained by evenly splitting an image to be displayed, the image information output unit 40 outputs image information of the split image corresponding to the top-left region to the image display device 10a; image information of the split image corresponding to the top-right region to the image display device 10b; image information of the split image corresponding to the bottom-left region to the image display device 10c; and image information of the split image corresponding to the bottom-right region to the image display device 10d, in parallel.

Figure 4:
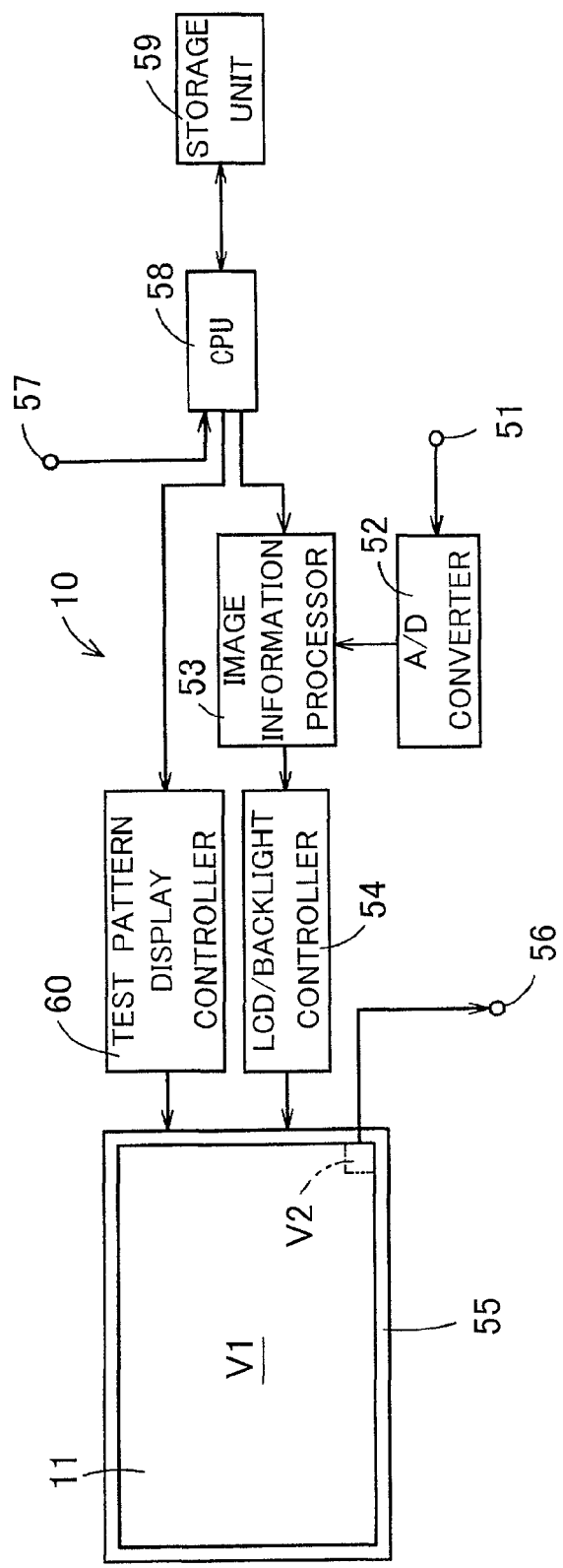
FIG. 4 is a block diagram showing the configuration of the image display device.

FIG. 4 is a block diagram showing the configuration of the image display device 10. The image display device 10 comprises an image information input terminal 51, an analog/digital (A/D) converter 52, an image information processor 53, an LCD/backlight controller 54, an LCD/backlight section 55, an optical fiber output terminal 56, a detection signal input terminal 57, a central processing unit (CPU) 58, a storage unit 59, and a test pattern display controller 60.

The image information input terminal 51 is a terminal to which the image information outputted by the image information output unit 40 is inputted as an analog or digital signal. The image information of the input analog signal is outputted to the A/D converter 52, and the image information of the input digital signal is outputted to the image information processor 53.

The A/D converter 52 converts the image information of the analog signal inputted to the image information input terminal 51 from an analog signal to a digital signal and outputs the image information of the converted digital signal to the image information processor 53.

The image information processor 53, which is a color correction unit, executes a color correction process using color correction information described later with respect to the image information of the digital signal inputted from the image information input terminal 51 or the A/D converter 52 in accordance with a command from the CPU 58 and outputs the image information of the digital signal having been subjected to the color correction process to the LCD/backlight controller 54. The color correction process will be described later.

The LCD/backlight controller 54 converts the image information of the digital signal inputted from the image information processor 53 into the image information of an analog signal and outputs the converted image information of the analog signal to the LCD/backlight section 55. Moreover, the LCD/backlight controller 54 controls the LCD/backlight section 55. For example, the LCD/backlight controller 54 controls the RGB driving of the LCD module 11 and controls luminance adjustment of the backlight unit 12.

The LCD/backlight section 55 comprises the LCD module 11 and the backlight unit 12 shown in FIG. 2. The LCD/backlight section 55 causes the light emitted from the backlight unit 12 to pass through the color filter 64 of the LCD module 11 to thereby produce the color of the image information.

The optical fiber output terminal 56 is a terminal for guiding the emitted light outputted from the display region V2 of the image display device 10 to the outside of the image display device 10. That is, the first optical fiber 21 described above comprises an optical fiber cable provided in the image display device 10, the optical fiber output terminal 56, and an optical fiber cable connected to the optical fiber output terminal 56 from the outside of the image display device 10.

The detection signal input terminal 57 is a terminal to which the detection signal outputted by the spectral radiance sensor 30 is inputted. The detection signal outputted by the spectral radiance sensor 30 is inputted to the CPU 58 through the detection signal input terminal 57.

The CPU 58 controls the image information processor 53 and the test pattern display controller 60 by executing a program stored in the storage unit 59.

The storage unit 59 is configured by a semiconductor memory and stores the program executed by the CPU 58 and information which is used when the CPU 58 executes the program. In the storage unit 59, the image information of the test pattern to be displayed in the display region V2 of the image display device 10 is stored. Moreover, a predetermined reference value is stored as spectral characteristics for the test pattern.

Here, the image information of the test pattern is image information for sequentially producing color based on the color signal for each gradation of the colors of R, G, B, and gray. For example, when the color signal is a 8-bit signal, and the gradation values of the color signals of the respective primary colors are expressed by (R,G,B), the image information of the test pattern is image information for sequentially displaying the 20 display colors having the gradation values (255,0,0), (200,0,0), (100,0,0), (50,0,0), (0,0,0), (0,255,0), (0,200,0), (0,100,0), (0,50,0), (0,0,0), (0,255,0), (0,200,0), (0,100,0), (0,50,0), (0,0,0), (255,255,255), (200,200,200), (100,100,100), (50,50,50), and (0,0,0). In the present embodiment, image information for displaying the 20 display colors is used as the image information of the test pattern.

Moreover, C (Cyan), M (Magenta), and Y (Yellow) may be used in addition to R, G, and B. In this case, for example, when the color signal is a 8-bit signal, and the gradation values of the respective color signals are expressed by (R,G,B), by the additive mixing, image information for displaying the 15 display colors having the gradation values (0,255,255), (0,200,200), (0,100,100), (0,50,50), (0,0,0), (255,0,255), (200,0,200), (100,0,100), (50,0,50), (0,0,0), (255,255,0), (200,200,0), (100,100,0), (50,50,0), and (0,0,0) is used as the image information of the test pattern.

In the exemplary image information of the test pattern, although gradation values having 5 levels were used for each color signal, 8-bit gradation values having all of the 256 (0 to 255) levels may be used. As described above, since a plurality of color signals is used for the image information of the test pattern displayed in the display region V2, it is possible to adjust the chromaticity of the image display device 10. Since a plurality of gradation values is used for each color signal, it is possible to execute gamma correction of the image display device 10.

The test pattern display controller 60 causes a plurality of predetermined display colors to be sequentially displayed based on the image information of the test pattern stored in the storage unit 59 in the display region V2 of the image display device 10 in accordance with an execution command from the CPU 58. The display period t for one display color can be set appropriately, and for example, is set to t=0.5 (seconds). In this case, if the number of display colors is n, the period T necessary for displaying all display colors of the test pattern can be expressed by T=n×t. The test pattern display controller 60 is configured to periodically display the image information of the test pattern in the display region V2 until the adjustment process ends.

The CPU 58 outputs an execution command for executing the adjustment process of adjusting luminance and chromaticity of the image display device 10 to the test pattern display controller 60 at a predetermined cycle. That is, the adjustment process is executed at the point in time when the execution command is outputted from the CPU 58. The execution cycle CT of the adjustment process can be set appropriately, and for example, is preferably set to CT=30 to 60 (minutes) when luminance variation of a backlight or the like is taken into account. Moreover, when changes over time and annual changes are taken into consideration, the execution cycle is preferably set to predetermined number of days, weeks, or months. An adjustment process controller is realized by the CPU 58.

Moreover, upon receiving the detection signal from the spectral radiance sensor 30, the CPU 58 generates color correction information to be used for the color correction process based on the detection signal. A color correction information generator is realized by the CPU 58. Moreover, the adjustment unit is realized by the image information processor 53, the CPU 58, and the storage unit 59.

Next, a method in which the CPU 58 generates the color correction information using the image information of the test pattern made up of 20 display colors will be described.

The CPU 58 generates a spectral colorimetric value Gj for each display color Fj (where j=1 to 20) included in the test pattern based on the input detection signal. The spectral colorimetric value Gj is a value (XYZ value) that is measured by the spectral radiance sensor 30 detecting the emitted light when the display color Fj (RGB value) is displayed in the display region V2. For the sake of simplicity, a method of correcting luminance and chromaticity of the primary color points R, G, and B, namely R(255,0,0), G(0,255,0), and B(0,0,255) will be described below.

When the color signal of the image information of the test pattern is expressed by a function f(R,G,B) of the RGB color system, the color signal expressed by the function f(R,G,B) is displayed in the display region V2 of the image display device 10, the color signal measured by the spectral radiance sensor 30 is expressed by a function g1(X,Y,Z) of the XYZ color system, and a conversion matrix thereof is expressed by M, the relation of Equation (1) is satisfied.

$$g1(X,Y,Z)=f(R,G,B)\cdot M \quad (1)$$

Here, "·" is an operator symbol representing multiplication of matrices. A case in which luminance and chromaticity are corrected so that the relation of Equation (1) is always satisfied with respect to all image display devices 10a to 10d of the multi-display system 1 will be considered.

When a luminance shift and a chromaticity shift occur due to the individual differences between the respective image display devices 10a to 10d, a temporal change, an annual change, and the like, and the relation of Equation (1) is not satisfied, the relation of Equation (2) below is satisfied between the color signal f(R,G,B) of the image information of the test pattern and the color signal g2(X,Y,Z) measured by the spectral radiance sensor 30.

$$g2(X,Y,Z)=f(R,G,B)\cdot N \quad (2)$$

Here, the conversion matrices M and N are all 3-by-3 matrices, and M≠N.

By correcting the color signal g2(X,Y,Z) of the image display device 10 in which a luminance shift and a chromaticity shift occur so as to be identical to the reference color signal g1(X,Y,Z), it is possible to make the display colors of all image display devices 10a to 10d identical to each other. When the correction matrix for making g2(X,Y,Z) identical to g1(X,Y,Z) is A, the relation of Equation (3) is satisfied.

$$g2(X,Y,Z)\cdot A=g1(X,Y,Z) \quad (3)$$

When a matrix ($N^{-1} \cdot M$) is multiplied to each right term of both sides of Equation (2), Equation (2) becomes Equation (4).

$$g2(X, Y, Z) \cdot N^{-1} \cdot M = f(R, G, B) \cdot N \cdot N^{-1} \cdot M \qquad (4)$$
$$= f(R, G, B) \cdot M$$

Here, "$^{-1}$" is an operator symbol representing an inverse matrix.

Equation (4) can be modified to Equation (5) by Equation (1).

$$g2(X,Y,Z) \cdot N^{-1} \cdot M = g1(X,Y,Z) \qquad (5)$$

From Equations (3) and (5), the correction matrix A is calculated as $A=N^{-1} \cdot M$.

In this way, the correction matrix A, which is a correction coefficient, is calculated. When the correction matrix A is calculated, the CPU 58 outputs the correction matrix A to the image information processor 53 as color correction information. Upon receiving the color correction information from the CPU 58, the image information processor 53 executes the color correction process on the image information of the digital signal inputted from the image information input terminal 51 or the A/D converter 52 using the color correction information. Specifically, the image information processor 53 executes the color correction process by multiplying the correction matrix A to the right side with respect to the respective pixels of an image represented by the image information. Although the color correction process has been described by way of the primary color points, the gamma correction of the image display device 10 may be executed by calculating the correction matrix A for other color points other than the primary color points and executing the color correction process.

Figure 5:
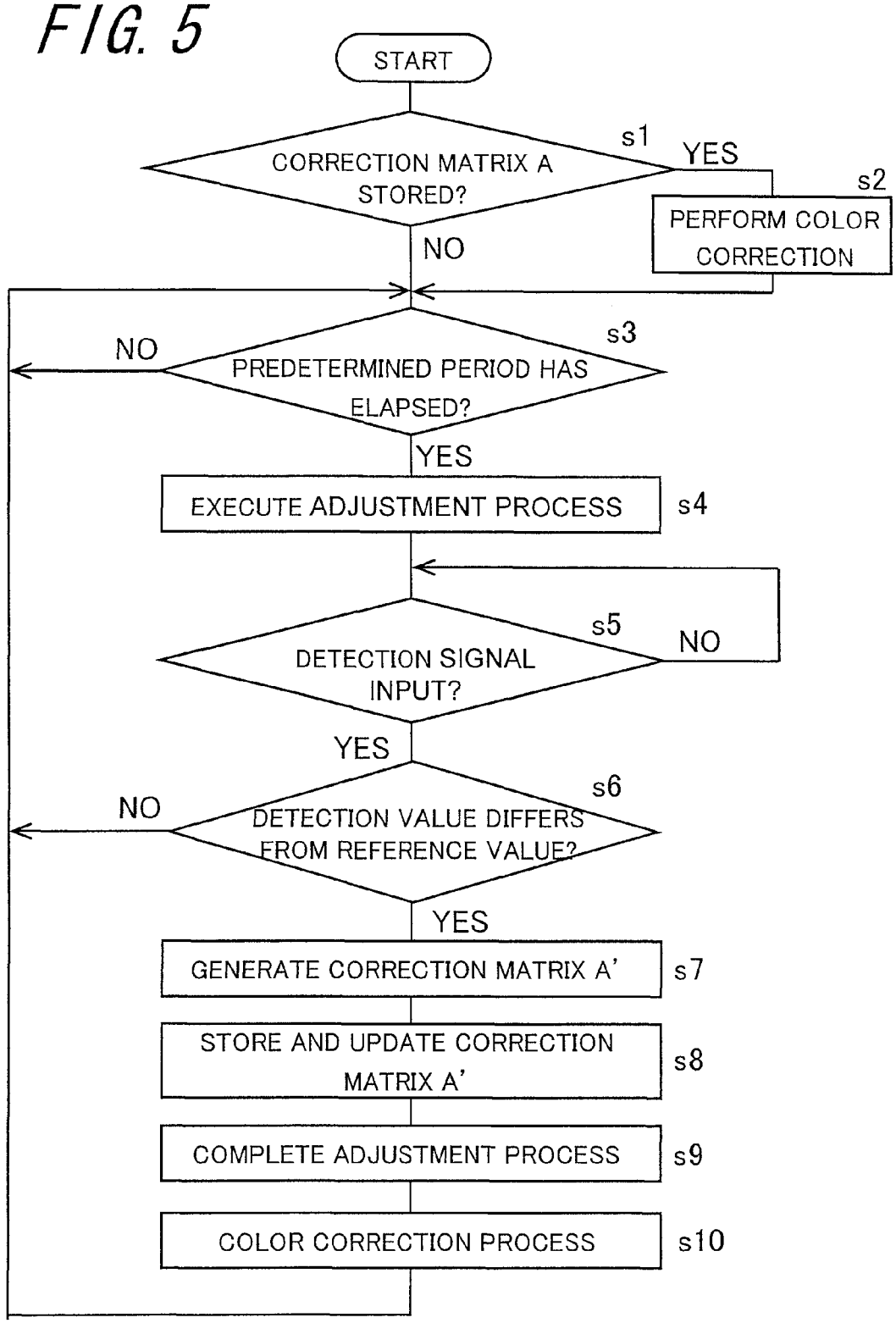
FIG. 5 is a flowchart showing the operation of the image display device.

Next, the adjustment process of luminance and chromaticity of the multi-display system 1 will be described. FIG. 5 is a flowchart showing the operation of the image display device 10.

When the multi-display system 1 is turned on, and image information is outputted from the image information output unit 40 to the image display device 10, the procedure proceeds to step s1.

In step s1, the CPU 58 determines whether a correction matrix A is stored in the storage unit 59. When it is determined that the correction matrix A is stored, the procedure proceeds to step s2. When it is determined that the correction matrix A is not stored, the procedure proceeds to step s3.

In step s2, the CPU 58 outputs a command for executing a color correction process using the correction matrix A stored in the storage unit 59 to the image information processor 53. When the command is outputted, the procedure proceeds to step s3.

Upon receiving the command for the color correction process from the CPU 58, the image information processor 53 enters a color correction mode. In the color correction mode, the image information processor 53 executes the color correction process using the correction matrix A with respect to the image information of the digital signal inputted from the image information input terminal 51 or the A/D converter 52 and output the image information of the digital signal having been subjected to the color correction process to the LCD/ backlight controller 54. When the image information processor 53 enters the color correction mode, the image information having been subjected to the color correction process is displayed in the display region V of the image display device 10.

When it is determined in step s1 that the correction matrix A is not stored, the image information processor 53 does not execute the color correction process using the correction matrix. Therefore, the image information which has not been subjected to the color correction process is displayed in the display region V of the image display device 10.

In step s3, the CPU 58 determines whether a predetermined period CT has elapsed from the time when the previous adjustment process was executed. When it is determined that the predetermined period CT has elapsed, the procedure proceeds to step s4. When it is determined that the predetermined period CT has not elapsed, the procedure returns to step s3.

In step s4, the CPU 58 outputs an execution command for executing the adjustment process of adjusting luminance and chromaticity of the image display device 10 to the test pattern display controller 60. In this way, the adjustment process starts. When the adjustment process starts, the procedure proceeds to step s5.

Upon receiving the execution command for the adjustment process, the test pattern display controller 60 periodically displays the image information of the test pattern stored in the storage unit 59 in the display region V2 of the image display device 10. In this way, the image information outputted from the image information output unit 40 is displayed in the display region V1, and the image information of the test pattern is periodically displayed in the display region V2.

In step s5, the CPU 58 determines whether a detection signal is inputted from the spectral radiance sensor 30. When it is determined that the detection signal is inputted, the procedure proceeds to step s6. When it is determined that the detection signal is not inputted, the procedure returns to step s5.

In step s6, the CPU 58 compares a detected spectral radiance value of the emitted light of each display color and a reference spectral radiance value of each display color stored in the storage unit 59 based on the input detection signal. Specifically, a difference δ between the detected value and the reference value is compared with a predetermined reference value α. If the difference δ is equal to or greater than the reference value α, the procedure proceeds to step s7. If the difference δ is smaller than the reference value α, the procedure returns to step s3.

In this way, since the CPU 58 generates the correction matrix A' only when the difference δ is equal to or greater than the reference value α, it is not necessary to generate the correction matrix A' every time. Thus, it is possible to shorten the processing time when it is not necessary to generate the correction matrix A'.

In step s7, the CPU 58 generates the correction matrix A' based on the detected spectral radiance value of the emitted light of each display color and the reference value of the spectral radiance of each display color stored in the storage unit 59. When the correction matrix A' is generated, the procedure proceeds to step s8.

In step s8, the CPU 58 stores the correction matrix A' generated in step s7 in the storage unit 59 when the correction matrix A is not stored in the storage unit 59. Moreover, when the correction matrix A is already stored in the storage unit 59, the CPU 58 updates the correction matrix A stored in the storage unit 59 with the correction matrix A' generated in step s7. When the new correction matrix A' is stored in the storage unit 59, the procedure proceeds to step s9.

In step s9, the CPU 58 outputs a completion command for the adjustment process to the test pattern display controller 60. In this way, the adjustment process ends. When the adjustment process is completed, the procedure proceeds to step s10.

Upon receiving the completion command for the adjustment process, the test pattern display controller 60 stops displaying the image information of the test pattern in the display region V2 of the image display device 10. In this way, the image information outputted from the image information output unit 40 is displayed in the display region V.

In step s10, the CPU 58 outputs a command for executing a color correction process using the correction matrix A' stored in the storage unit 59 to the image information processor 53. When the command is outputted, the procedure returns to step s3.

Upon receiving the command for the color correction process from the CPU 58, the image information processor 53 enters the color correction mode as described above. In this way, the image information which has been subjected to a color correction process using the correction matrix A' is displayed in the display region V of the image display device 10.

The operation of the image display device 10 ends when the multi-display system 1 is turned off.

Figure 6:
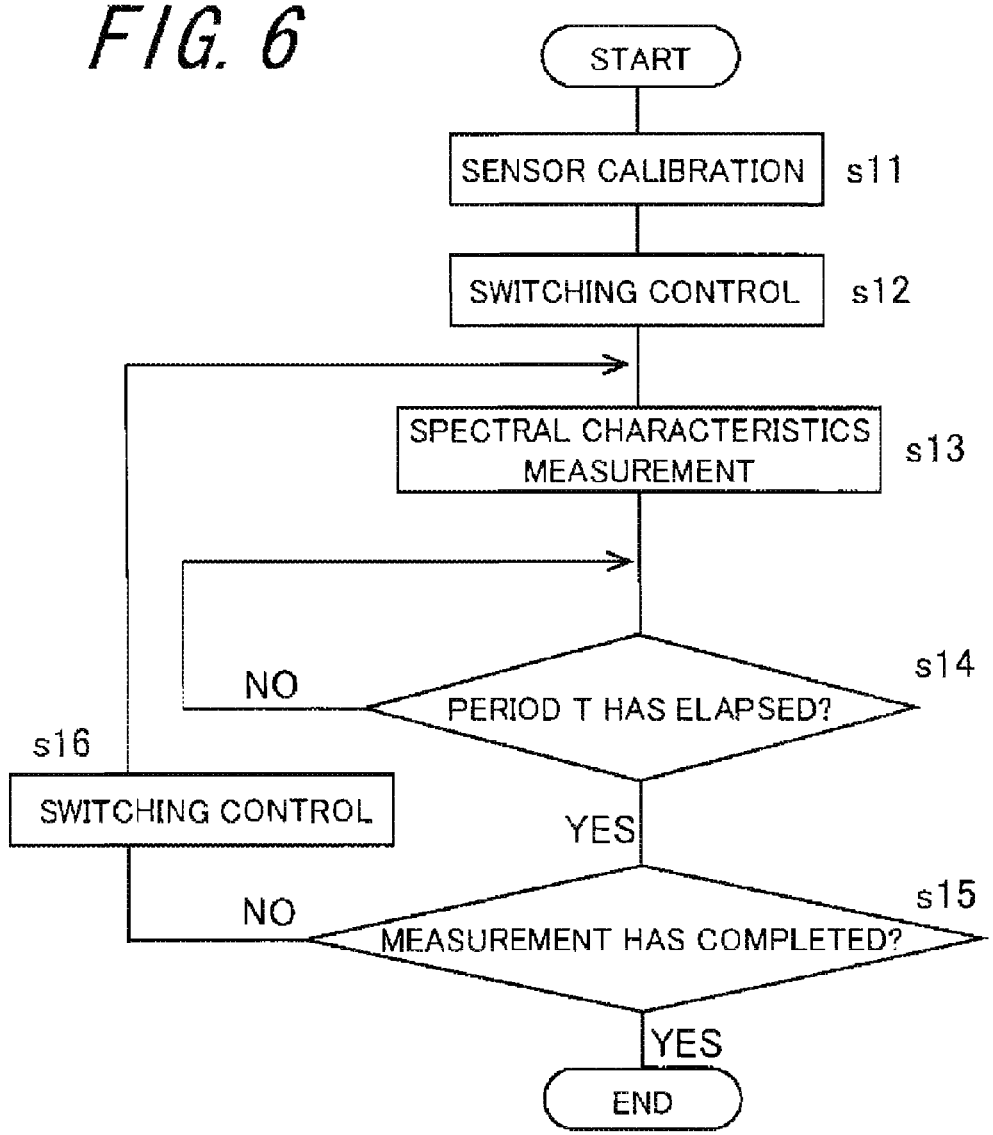
FIG. 6 is a flowchart showing the operation of a switching controller and a spectral radiance sensor.

FIG. 6 is a flowchart showing the operation of the switching controller 25 and the spectral radiance sensor 30. When the adjustment process starts in accordance with the execution command from the CPU 58, the procedure proceeds to step s11.

In step s11, the switching controller 25 outputs a switching control signal to the switches 24a to 24d and an electronic shutter which is provided in the calibration optical fiber so that the switches 24a to 24d are in the cut-off state and the electronic shutter is in the transmission state. Moreover, calibration of the spectral radiance sensor 30 is realized by the sensor calibrator described above. When the calibration starts, the procedure proceeds to step s12.

In step s12, the switching controller 25 outputs a switching control signal to the switches 24a to 24d and the electronic shutter provided in the calibration optical fiber in accordance with the program stored in the storage device so that the switch 24a, which is the first to be in the transmission state, enters the transmission state, and the remaining switches 24b to 24d and the electronic shutter are in the cut-off state. The time when the switching control signal is outputted is identical to the time when the first display color of the test pattern is displayed. When the switching control signal is outputted, the procedure proceeds to step s13.

In step s13, the spectral radiance sensor 30 detects the spectral characteristics of the emitted light from the display region V2 of the image display device 10a. The spectral radiance sensor 30 outputs the detection signal indicating the detected spectral characteristics to the image display device 10a.

In step s14, the switching controller 25 determines whether a period T necessary for displaying all display colors of the test pattern has elapsed. When it is determined that the period T has elapsed, the procedure proceeds to step s15. When it is determined that the period T has not elapsed, the procedure returns to step s14.

In step s15, the switching controller 25 determines whether all switches 24a to 24d have been set to the transmission state. When it is determined that any one of the switches 24a to 24d has not been set to the transmission state, the procedure proceeds to step s16.

In step s16, the switching controller 25 outputs the switching control signal to the switches 24a to 24d in accordance with the program stored in the storage device so that the switch 24b, which is the next to be in the transmission state, enters the transmission state, and the remaining switches 24a, 24c, and 24d are in the cut-off state.

When it is determined in step s15 that all switches 24a to 24d have been set to transmission state, all switches 24a to 24d are set to the cut-off state, and the measurement ends.

As described above, according to the present embodiment, the test pattern for adjusting luminance and chromaticity is displayed in the predetermined display region V2 on the periphery of the LCD module 11 of each of the image display devices 10 constituting the multi-emitted light from the display region V2 when the test pattern is displayed is detected by the spectral radiance sensor 30. Moreover, the CPU 58 adjusts, based on the spectral characteristics detected by the spectral radiance sensor 30, luminance and chromaticity of the image display device 10 having the display region V2 that has outputted the emitted light having the spectral characteristics so that its difference from luminance and chromaticity of the adjacent image display devices 10 decreases.

Therefore, the LCD modules 11 of the respective image display devices 10 can display the test pattern in the display region V2 on its periphery and display the image information outputted from the image information output unit 40 in the remaining display region V1 excluding the display region V2. That is, even when the multi-display system 1 is being operated, it is possible to adjust luminance and chromaticity of the respective image display device 10.

Moreover, it is not necessary to execute adjustment for each image display device 10 using a dedicated adjustment device unlike the related art, but luminance and chromaticity of the respective image display devices 10 are adjusted automatically. Thus, an adjustment operation by an operator is not necessary, and the luminance shift and chromaticity shift between the adjacent image display devices 10 can be eliminated easily. In addition, since the size of the display region V2 is set to one dot pixel, even when the test pattern is displayed during the operation of the multi-display system 1, it is possible to minimize the effect on the visibility of the image displayed in the display region V1.

Furthermore, luminance and chromaticity of the respective image display devices 10 are corrected based on the detected spectral characteristics of the emitted light from the display region V2 when the test pattern is displayed. Therefore, it is possible to eliminate the luminance shift and the chromaticity shift between the adjacent image display devices 10 resulting from the individual differences of the respective image display devices 10 and the temporal change. Thus, it is possible to display images on the multi-display screen 1a without giving a feeling of unease to the observer.

In addition, according to the present embodiment, the transmission channel for transmitting the emitted light from the display region V2 is configured by connecting the plurality of first transmission channels provided in the respective display regions V2 and the single second transmission channel connected to the single spectral radiance sensor 30 with the coupler 23, and the switches 24a to 24d are attached to the respective first transmission channels. The respective switches 24a to 24d are controlled by the switching controller 25 so that the respective first transmission channels sequentially enter the transmission state in a predetermined order.

As described above, since the spectral characteristics of the emitted light from the display region V2 of each of the respective image display devices 10 is detected by the single spectral radiance sensor 30, it is possible to decrease the overall cost of the multi-display system 1 as compared to when the spectral radiance sensor 30 is provided in each display region V2. Moreover, since it is not necessary to take the individual differences between the spectral radiance sensors into account, it is possible to adjust luminance and chromaticity accurately.

When the spectral radiance sensor 30 is provided in each display region V2, individual differences between the plural sensors, and an operational delay and a control delay due to sensing and A/D conversion may occur. However, since measurement is executed by the single spectral radiance sensor 30, the individual differences are eliminated, and the operational delay and the control delay can be suppressed.

In addition, according to the present embodiment, in the multi-display system 1, the CPU 58 outputs the execution command for the process of adjusting luminance and chromaticity of the image display device 10 to the test pattern display controller 60 at a predetermined cycle CT. Therefore, it is possible to dynamically cope with changes over time in the image display device 10 or a sudden change in the operational conditions and to eliminate the luminance shift and the chromaticity shift between the adjacent image display devices 10 following the decrease and variation in the display performance.

In the above embodiment, although the multi-display system has been configured by arranging four image display devices close to each other in a matrix form, the technology is not limited to this configuration. For example, a multi-display system may be configured by arranging 16 image display devices close to each other in a 4-by-4 matrix form. Moreover, a multi-display system may be configured by arranging three image display devices having a vertically long rectangular screen close to each other so that the longer sides are adjacent to each other. Moreover, the screen sizes of the image display devices 10 are not exactly identical to each other.

In addition, in the above embodiment, although one display region V2 is set to each image display device 10, the display region V in one image display device 10 may be evenly split into four split regions V' along the vertical and horizontal cross lines, for example, and the display region V2 may be set to each of the four split regions V'. In this case, the display region V2 is set at the four corners of the display region V, for example.

By splitting the display region V into split regions V' as described above, it is possible to adjust luminance and chromaticity for each split region V'. In this case, it is preferable to adjust luminance and chromaticity so that no tone gap occurs at the boundaries between the respective split regions V', namely so that the color changes continuously at the boundaries.

Figure 7:
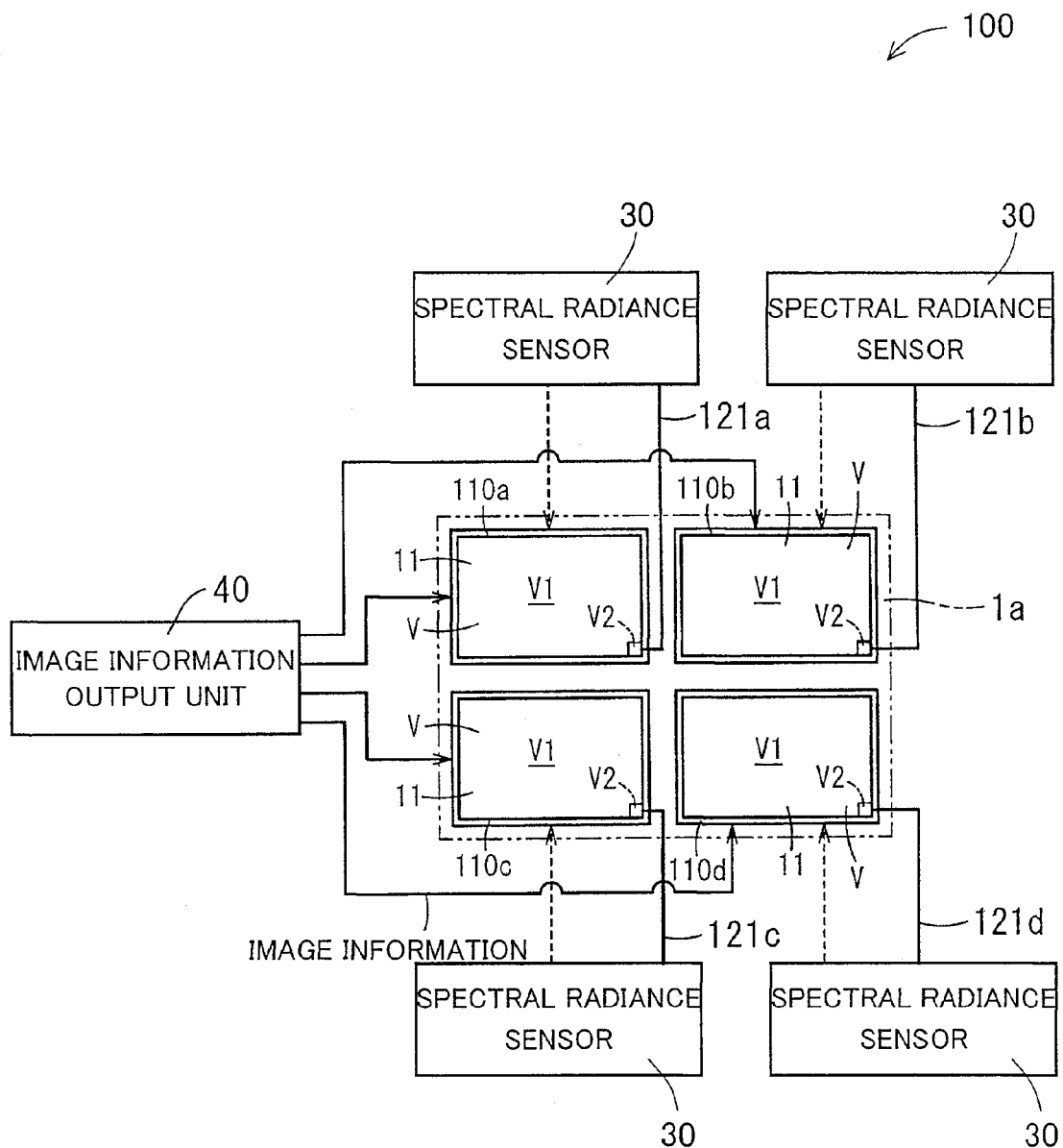
FIG. 7 is a system diagram schematically showing a multi-display system according to another embodiment.

FIG. 7 is a system diagram schematically showing a multi-display system 100 according to another embodiment. The multi-display system 100 comprises four image display devices 110a to 110d, the optical transmitting unit 20, four spectral radiance sensors 30, and the image information output unit 40. The optical transmitting unit 20 is configured by four optical fibers 121a to 121d capable of transmitting the emitted lights outputted from the display regions V2 of the respective image display devices 110a to 110d to the respective spectral radiance sensors 30.

As shown in FIG. 7, the multi-display system 100 according to the present embodiment is different from the multi-display system 1 described above in that the spectral radiance sensor 30 is provided in each image display device 110. In addition, the same configurations as the multi-display system 1 will be denoted by the same reference numerals, and redundant description thereof will be omitted.

Figure 8:
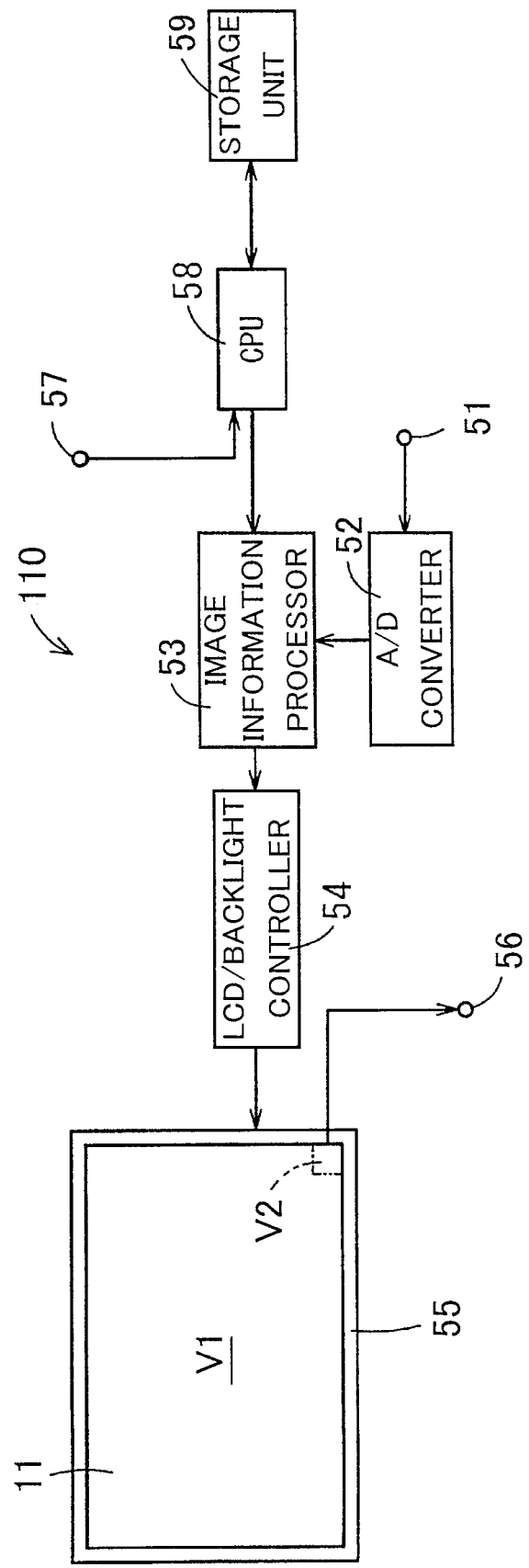
FIG. 8 is a block diagram showing the configuration of an image display device.
Figure 9:
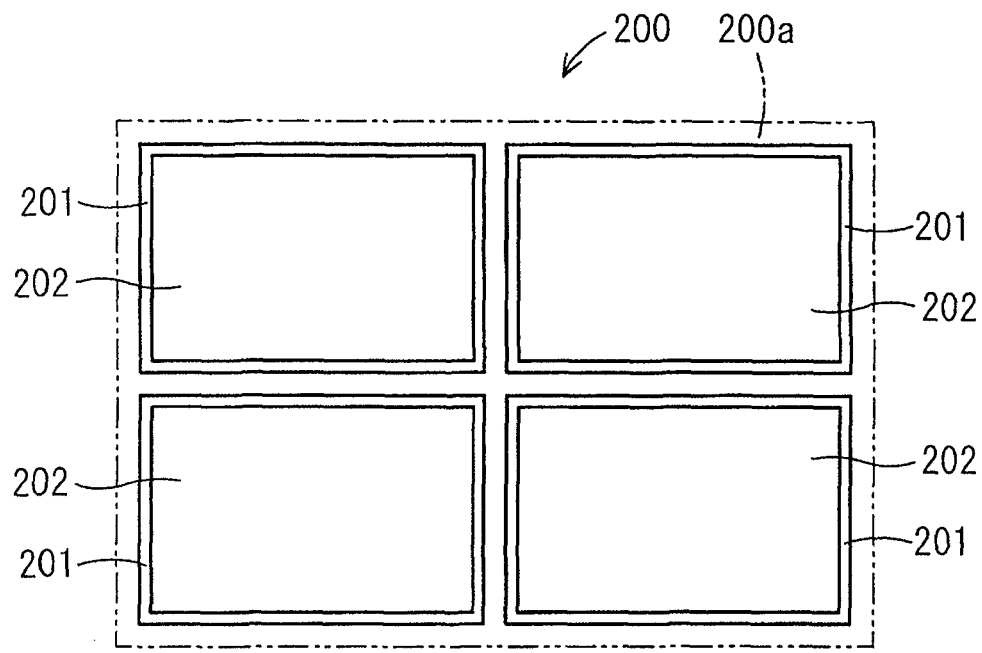
FIG. 9 is a view schematically showing a multi-display system according to the related art.

FIG. 8 is a block diagram showing the configuration of the image display device 110. The image display device 110 comprises the image information input terminal 51, the analog/digital converter 52, the image information processor 53, the LCD/backlight controller 54, the LCD/backlight section 55, the optical fiber output terminal 56, the detection signal input terminal 57, the CPU 58, and the storage unit 59. That is, the image display device 110 is different from the image display device 10 in that it does not have the test pattern display controller 60.

The multi-display system 100 according to the present embodiment is configured so that the image information of the test pattern described above is not displayed in the display region V2 of the image display device 100, but the image information outputted from the image information output unit 40 is displayed in the display region V2. Therefore, the emitted light outputted from the display region V2 in accordance with the image information outputted from the image information output unit 40 is continuously inputted to the spectral radiance sensor 30, and the spectral radiance sensor 30 continuously outputs the detection signal representing the spectral characteristics of the input emitted light to the corresponding image display device 110.

The CPU 58 of the image display device 110 continuously monitors the display color displayed in accordance with the image information, extracts the spectral characteristics of the emitted light when a predetermined display color, for example, RGB primary color and color mixture of RGB primary color, is displayed from the detection signal outputted from the spectral radiance sensor 30, and stores the spectral characteristics in the storage unit 59. When it is determined that the spectral characteristics of the emitted light of the display color has been acquired with respect to all of the plurality of predetermined display colors which are display colors necessary for performing adjustment of luminance and chromaticity, the CPU 58 generates color correction information to be used for the color correction process by the same method as the above embodiment based on all spectral characteristics stored in the storage unit 59 and reference values which are determined in advance as the spectral characteristics of the plurality of predetermined display colors.

When the color correction information is generated by the CPU 58, the image information processor 53, which is a color correction unit, executes a color correction process using the color correction information with respect to the image information of the digital signal inputted from the image information input terminal 51 or the A/D converter 52.

As described above, since it is not necessary to display the test pattern in the display region V2, it is possible to simplify the configuration of the image display device 110. Moreover, even when the multi-display system 100 is being operated, it is possible to adjust luminance and chromaticity of the respective image display device 110.

Moreover, it is not necessary to execute adjustment for each image display device 100 using a dedicated adjustment device unlike the related art, but luminance and chromaticity of the respective image display devices 110 are adjusted automatically. Thus, an adjustment operation by an operator is not necessary, and the luminance shift and chromaticity shift between the adjacent image display devices 110 can be eliminated easily.

Furthermore, luminance and chromaticity of the respective image display devices 110 are adjusted based on the detected spectral characteristics of the emitted light from the display region V2 when the test pattern is displayed. Therefore, it is possible to eliminate the luminance shift and the chromaticity shift between the adjacent image display devices 110 resulting from the individual differences of the respective image display devices 110 and the temporal change. Thus, it is possible to display images on the multi-display screen 1a without giving a feeling of unease to the observer.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. A multi-display system comprising a multi-display screen formed by arranging a plurality of image display devices each having a display panel capable of displaying image information to lie side-by-side, the multi-display system comprising:
   a test pattern display controller that causes a plurality of predetermined display colors to be sequentially displayed in a predetermined display region on a periphery of each of the display panels;
   a transmitting unit that constitutes a plurality of transmission channels which are optical fibers each capable of transmitting an emitted light from the display region of each of the display panels;
   a spectral characteristics detector that detects spectral characteristics of the emitted light transmitted by each of the optical fibers; and
   an adjustment unit that adjusts, based on the spectral characteristics detected by the spectral characteristics detector, luminance and chromaticity of the image display device having the display panel that has outputted the emitted light having the spectral characteristics so that a difference from luminance and chromaticity of adjacent image display devices decreases,
   wherein the transmitting unit includes:
      a coupler that connects a plurality of first optical fibers provided in the display region of each of the display panels with a single second optical fiber connected to a single spectral characteristics detector for the plurality of image display devices so that the emitted light can be transmitted;
      switches that are attached to the respective first optical fibers and configured to be selectable between a transmission state where transmission of the emitted light in the respective first optical fibers allowed and a cut-off state where transmission of the emitted light in the first optical fibers is cut; and
      a switching controller that controls the respective switches so that the respective first optical fibers sequentially enter the transmission state in a predetermined order.

2. The multi-display system of claim 1, wherein the adjustment unit includes:
   a color correction information generator that generates color correction information for carrying out a color correction process on image information to be displayed on the respective display panels, based on the spectral characteristics detected by the spectral characteristics detector; and
   a color correction unit that executes a color correction process on the image information to be displayed on the respective display panels, using the color correction information generated by the color correction information generator.

3. The multi-display system of claim 2, wherein the adjustment unit further includes a storage unit that stores a reference value that is determined in advance as the spectral characteristics of the plurality of predetermined display colors, and
   the color correction information generator calculates a correction coefficient used for the color correction process, based on a detection value of spectral characteristics detected by the spectral characteristics detector and a reference value stored in the storage unit and outputs a calculated correction coefficient to the color correction unit as color correction information.

4. The multi-display system of claim 1, further comprising an adjustment process controller that outputs an execution command for a process of adjusting luminance and chromaticity of the image display device,
   wherein the adjustment process controller outputs the execution command at a predetermined cycle.

5. A multi-display system comprising a multi-display screen formed by arranging a plurality of image display devices each having a display panel capable of displaying image information to lie side-by-side, the multi-display system comprising:
   a transmitting unit that constitutes a plurality of transmission channels which are optical fibers each capable of transmitting an emitted light from a predetermined display region on a periphery of each of the display panels;
   a spectral characteristics detector that detects spectral characteristics of the emitted light transmitted by the optical fiber; and
   an adjustment unit that adjusts, based on the spectral characteristics detected by the spectral characteristics detector, luminance and chromaticity of the image display device having the display panel that has outputted the emitted light having the spectral characteristics so that a difference from luminance and chromaticity of adjacent image display devices decreases,
   the adjustment unit comprising a storage unit that stores a reference value that is determined in advance as spectral characteristics of a plurality of predetermined display colors, when the spectral characteristics of the emitted light for the predetermined display color is detected from the image information displayed on the display panel by the spectral characteristics detector, the storage unit storing the detected value of the spectral characteristics for each image display device, and
   when it is determined that the detected value of the spectral characteristics is acquired with respect to all of the plurality of predetermined display colors, with respect to an image display device in which the detection value of the spectral characteristics is stored for all of the plurality of display colors, the adjustment unit adjusting luminance and chromaticity of the image display device.

* * * * *